United States Patent

[11] 3,593,825

| [72] | Inventor | Luther Paul Gieseler<br>2835 Brook Drive, Falls Church, Va. 22042 |
|---|---|---|
| [21] | Appl. No. | 830,569 |
| [22] | Filed | May 13, 1969 |
| [45] | Patented | July 20, 1971<br>Continuation-in-part of application Ser. No. 578,255, Sept. 9, 1966, now abandoned. |

[54] ADAPTIVE CONTROL SYSTEM EMPLOYING A DIGITAL COMPUTER AS A FEEDBACK ELEMENT
8 Claims, 7 Drawing Figs.

| [52] | U.S. Cl. | 187/29 R |
|---|---|---|
| [51] | Int. Cl. | B66b 1/20 |
| [50] | Field of Search | 187/29;<br>235/150.2, 150.24 |

[56] References Cited
UNITED STATES PATENTS

| 3,065,823 | 11/1962 | Burgy | 187/29 |
|---|---|---|---|
| 3,244,243 | 4/1966 | Fielder | 235/150.2 X |
| 3,385,402 | 5/1968 | Burgy et al. | 187/29 |
| 3,397,306 | 8/1968 | Auer, Jr. | 235/150.24 |

*Primary Examiner*—Oris L. Rader
*Assistant Examiner*—W. F. Duncanson, Jr.
*Attorney*—Sughrue, Rothwell, Mion, Zinn & MacPeak

ABSTRACT: A control system for operating a transportation system including a plurality of vehicles, such as elevators, is disclosed wherein a history of the past performance of the transportation system is stored. This history is analyzed by a digital computer, and the operating mode of the transportation system is changed in accordance with the analysis in order to optimize the performance of the system.

PATENTED JUL 20 1971 3,593,825

INVENTOR
LUTHER P. GIESELER

BY
*Sughrue, Rothwell, Mion, Zinn & Macpeak*
ATTORNEYS

PATENTED JUL 20 1971

INVENTOR
LUTHER P. GIESELER

BY
ATTORNEYS 3,593,825

ADAPTIVE CONTROL SYSTEM EMPLOYING A DIGITAL COMPUTER AS A FEEDBACK ELEMENT

CROSS-REFERENCES TO RELATED APPLICATIONS

This application is a continuation-in-part of application Ser. No. 578,255 filed Sept. 9, 1966 now abandoned.

BACKGROUND OF THE INVENTION

1. Field of the Invention

This invention relates to an adaptive control system for operating transportation systems of a variety of different kinds. For example, it relates to controlling the movement of a group of passenger elevators in an optimum manner.

2. Description of the Prior Art

If the movement of elevators were so adjusted as to achieve maximum performance, fewer elevators would be needed and savings would be achieved both by reducing the total cost of the elevators, and by releasing valuable building space to more productive uses.

Elevator control systems in present use may consist of:

1. Input devices, such as call pushbuttons and floor selectors,
2. Other pertinent variables such as the time of day, day of the week, etc.,
3. Door contacts, safety switches, etc.,
4. Logic switching which combines the information of 1, 2 and 3 into instructions to the power-operating units.
5. The power-operating units such as the hoisting motors, door closers, etc.

Item 4 is the control portion of the system and is the portion to which this invention pertains.

A different method of control is the "learning" of self-organizing system in which the performance of the system is constantly monitored so that a performance index is always available. The control portion of the system is caused to change in either a random or in a systematic fashion in a manner to maximize the performance index in much the same way that an animal learns from his mistakes. The disadvantage of the first system is that the design is usually based on performance estimates made long before actual use, and the design is furthermore relatively inflexible and cannot easily be adapted to changing circumstances. In addition, means for determining a performance index is not normally provided, and must be arrived at by a separate activity.

The disadvantage of the second system is that the "learning" process is achieved at considerable inconvenience to the general public. In addition, the equipment required to produce the learning effect is extremely complex and costly.

SUMMARY OF THE INVENTION

Accordingly, an object of this invention is to provide a control system which will operate a transportation system in an optimum manner.

Another object of this invention is to provide a control system which is adaptable to changing conditions without inconvenience to the users.

Yet another object of this invention is to provide a control system which is adaptable to changing conditions without the need for locating complex equipment on site and in full time use.

According to the present invention, the foregoing and other objects are attained by providing within a transportation system, such as an elevator system within a building, a digital computer as a feedback element. The digital computer receives as inputs signals from the system indicating demands exceeding capacity of the vehicles. The signals are stored and cataloged according to floors where the excess demands occurred, time of day, and day of the week. A history of system operation is thereby generated. Periodically, at selected intervals, such as weekly, this history is analyzed by the digital computer. Based on this analysis, the computer modifies the control of the system to optimize performance. Because the control is based on the history of past performance, it is an adaptive control system. Furthermore, the system is extremely flexible since the control of the system will change with changes in demand.

BRIEF DESCRIPTION OF THE DRAWINGS

The specific nature of the invention, as well as other objects, will become apparent from the following description taken in conjunction with the drawings wherein.

DESCRIPTION OF THE PREFERRED EMBODIMENTS

Figure 1:
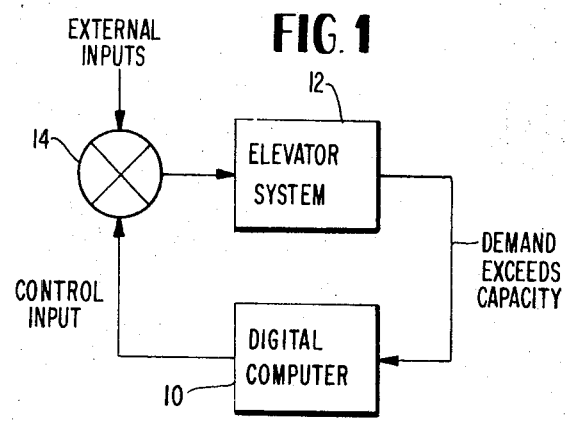
FIG. 1 is a simplified block diagram illustrating the basic concept of the invention.

Referring now to the drawings, and more particularly to FIG. 1 thereof, the simplified block diagram illustrates the basic concept of the invention. The system 12, which in the preferred embodiment is an elevator system, is substantially conventional in that it receives external inputs, such as call inputs from various floors and floor select inputs from the control panel within the vehicle, and operates according to demand, returning to the ground floor after all demands have been satisfied. According to the teaching of this invention, the system is modified to provide outputs indicating demands exceeding capacity. The outputs are inputed to a digital computer 10 which stores them and catalogs them according to floors on which they occurred, time of day, day of the week, and so forth. There is thus generated a history of system performance pertaining to demands that exceed the system capacity. Some of these demands will be random, occurring at different times and at or between different floors; however, others will establish a definite pattern.

Periodically, at weekly intervals, the digital computer is programmed to analyze the history thus generated to identify those demands exceeding capacity which fall into the latter category, that is, establish a definite pattern. This is analogous to integrating the output signals from the system. Those signals which are random will average out to zero, while those that recur on a periodic basis will reenforce. Based on this analysis, the digital computer 10 generates a control input to the system which causes the performance of the system to be modified. For example, if at a particular time of day traffic is found to be excessive at a particular floor, the system is made to operate in a "rest" mode wherein it will return to that floor instead of the ground floor after all call requests have been satisfied. If the excessive traffic is found to occur predominately between two floors at definite times of the day, the system is made to operate in an "express" mode between those two floors at those times.

The control inputs are combined with the external inputs at the summing junction 14. The resulting output is a composite of the two and serves to control the system 12. The control inputs from computer 10 periodically change in order to optimize system performance as indicated by analysis of the updated history.

Figure 2:
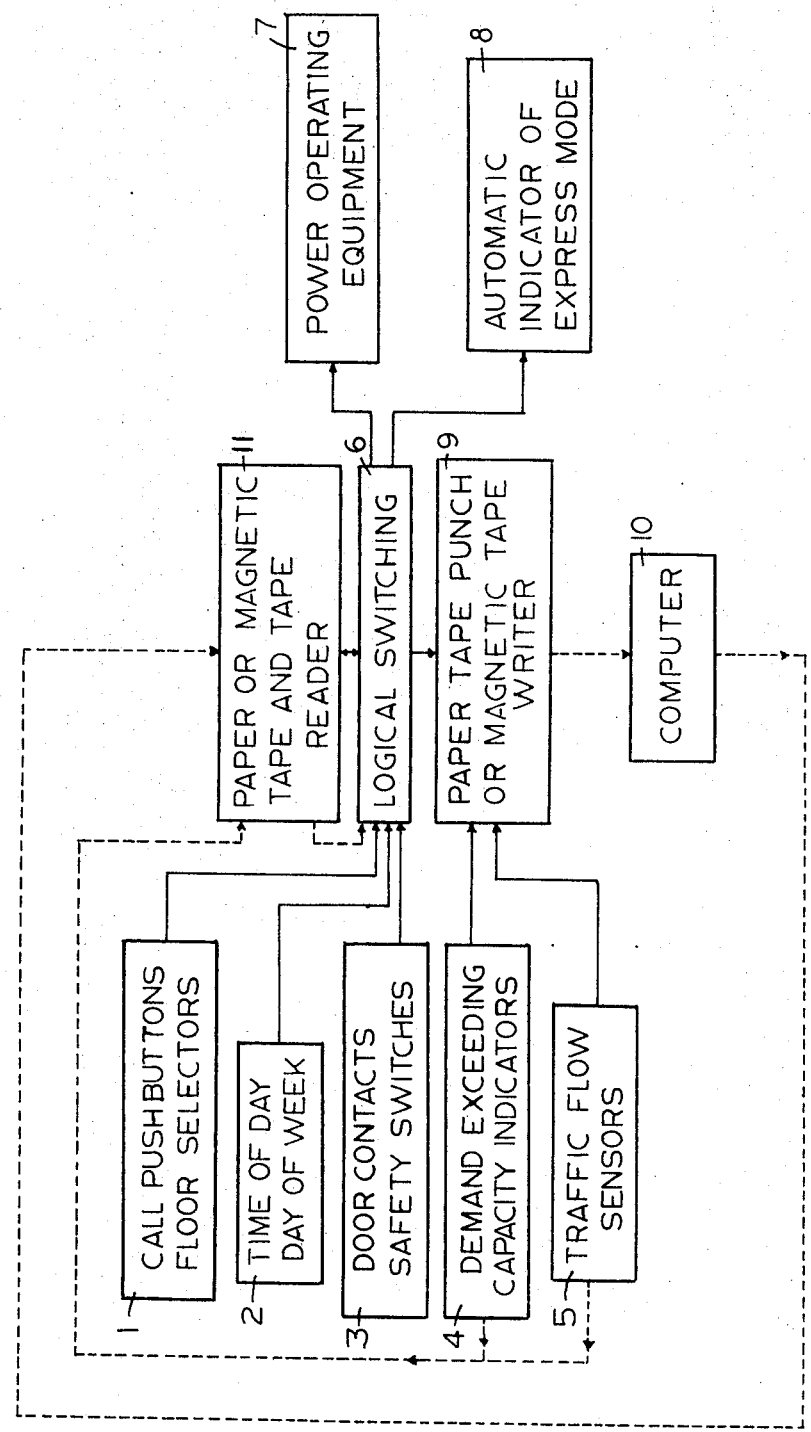
FIG. 2 is a block diagram showing in more detail the features described in connection with FIG. 1, FIGS. 3 and 4 are schematic illustrations of two types of performance indicating sensors.

Referring now to FIG. 2, block 1 consists of call pushbuttons located in a fixed wall near the elevator doors, and floor selectors, which are pushbuttons located inside the elevators and which are operated by the users. Block 2 is a clock which indicates the time of day and the day of the week in digital form suitable for registering on the paper-tape punch or magnetic-tape writer. Block 3 consists of limit switches on the elevator doors which give an indication when the doors are closed. Block 4 consists of a sensing device indicating when the demand for elevator service exceeds the capacity of an elevator. This consists of a number of switches located in the floor of the building in front of the elevator door. The switches are connected in series and close when a person is standing at or near them. When more persons are waiting than can be accommodated by one elevator, all switches will be closed and a closed circuit will be produced. Block 5 is a device which emits an output when the traffic into or out of an elevator exceeds a predetermined amount.

Block 6 consists of logical circuitry employing relays, transistors, and electromechanical devices of various types. Block 7 consists of the main hoisting motors and the elevator door actuating mechanisms. Block 8 consists of signs which are automatically controlled by block 6, and indicate to the users which elevators are in the express mode, and between what floors they are operating. Block 9 is a paper-tape punch or a magnetic-tape writer which records the outputs of the sensors of blocks 4 and 5 as controlled by the logical switching unit. Block 10 is a general purpose digital computer which accepts the data stored in block 9 as its input, and produces a reel of magnetic or paper tape, which is then mounted on the tape reader of block 11. Blocks 9, 10 and 11 may be combined into a single digital computer system.

The portion of the system comprising blocks 1, 3, 7 and parts of block 6 will operate the elevator system in a conventional manner, and the design of this portion of the system is well known to the control art. During the operation of the elevator system information is registered about the performance of the system. This is stored in block 9 as a three-column table, the first column giving the time interval and the day of the week as registered by block 2. The second column indicates whether the demand has exceeded the capacity, and which floor is involved. The third column indicates whether the sensors of block 5 have indicated an amount of traffic greater than a predetermined fixed amount and which floor is involved. The above-mentioned table will be referred to as table 1 in the following paragraphs.

A second table, known as table 2, is stored on the magnetic or paper tape of block 11, and is read by the tape reader during the operation of the elevator system. Table 2 also consists of a number of columns, the first column indicating the time of day as in table 1. The remaining columns indicate the mode of operation of the elevators.

Two special modes of operation of the elevators are used—a "resting" mode and an "express" mode. In addition, there is a "normal" mode, which is the mode in force if no instructions at all are present.

In the normal mode, an elevator returns to the ground floor after all call requests have been satisfied. In the resting mode, the elevator returns instead to the floor specified by the resting instruction. In the express mode, the elevator travels without stopping between the two floors specified by the express instruction. An automatic sign is also actuated which notifies the users of this mode (see block 8 of FIG. 2). The additional columns of table 2 are arranged in pairs with one pair for each elevator. The first column of the pair directs the logical switching block to operate the elevator in the resting mode, the resting floor being the number in that column, and the second column of the pair contains two numbers, and these direct the logical switching block to operate the elevator in the express mode between the two floors corresponding to the two numbers.

Figure 3:
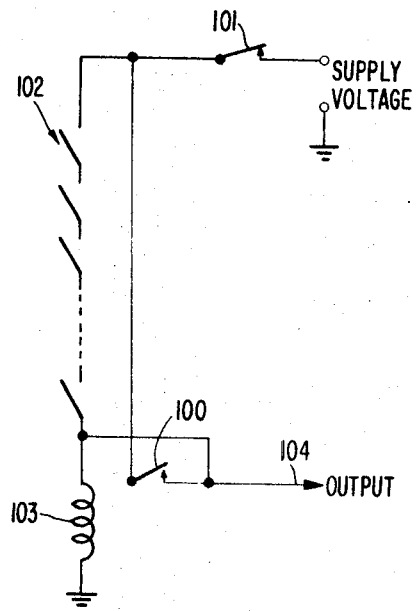

In FIG. 3 the normally open switches 102 are located in the floor in front of the elevator door. The switches are designed to close when a person is standing at or near them. When more persons are waiting than can be accommodated by one elevator, that is, when the demand for service exceeds the capacity of the elevator, all switches will be closed, and a closed circuit will be produced. This closes relay 103, and a holding contact 100 maintains the relay in a closed condition until reset switch 101 is opened. An output signal indicating that the demand exceeded the capacity at least once during successive reset operations will appear on the output lead 104.

Figure 5:
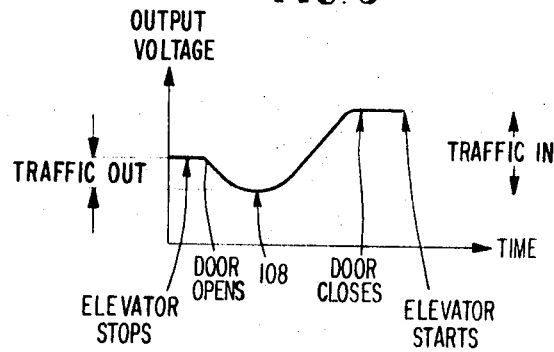
FIG. 5 is a graph of output voltage vs. time for the sensors of FIG. 4.
Figure 4:
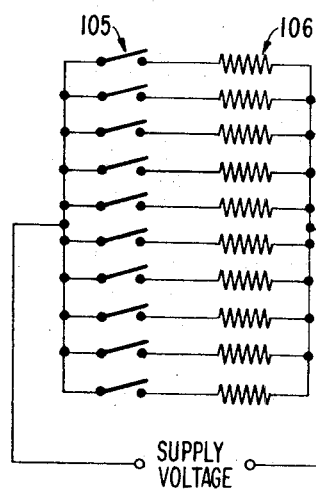

FIG. 4 is a diagram of a sensing system which measures the flow of traffic into and out of an elevator. Switches 105 are located in the elevator floor and, like switches 102 of FIG. 1, close when a person is standing at or near them. When all switches are closed the elevator will be substantially full. The switches connect to summing resistors 106 and produce an output voltage approximately proportional to the number of persons in the elevator. The analog-to-digital converter 107 samples this voltage a number of times between the opening and closing of the elevator doors and converts the magnitude of the voltage to digital form. As shown in FIG. 5, the difference between the voltage when the doors open and the minimum voltage 108 is proportional to the traffic out, and the difference between this minimum and the voltage when the door closes is proportional to the traffic into the elevator. The digital analyzer 109 performs the following manipulations on the series of numbers from the analog-to-digital converter:

1. Store the number occurring when door opens.
2. Determine the smallest number and store.
3. Store the number occurring when door closes.
4. Subtract 2 from 1 above. If this number exceeds a predetermined amount, output a signal on lead 110.
5. Subtract 2 from 3 above. If this number exceeds a predetermined amount, output a signal on lead 111.

Figure 6:
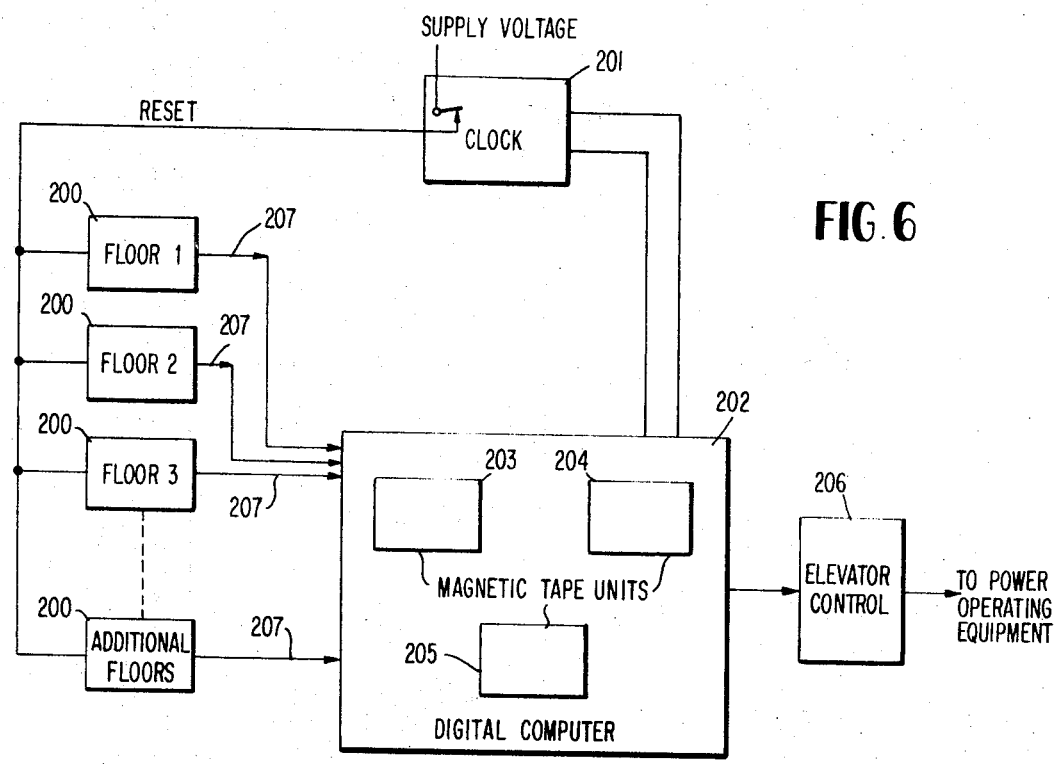
FIG. 6 is a block diagram of an elevator system having one elevator, one type of performance indicating sensor, and two modes of operation.

In FIG. 6, blocks 200 are demand exceeding capacity sensors, similar to FIG. 3, one on each floor of the building. Signals from these sensors are transmitted over wires 207 to a digital computer 202. A clock 201 momentarily interrupts the supply voltage every 5 minutes, and resets the sensors. The digital computer contains three special magnetic tape units 203, 204, and 205, capable of independent operation. During the operation of the elevator system information is registered about the performance of the system. This is stored in tape unit 203 as table 1. The first column stores the day of the week, and the time of day, as transmitted from the clock 201. The second column stores the demand exceeding capacity signals. An entry is recorded every 5 minutes.

A second table, table 2, is stored in tape unit 204. The first column of this table registers the day of the week and the time of day, as in table 1. Entries have been recorded in 5-minute intervals. The second column registers the operational mode of the elevator system during the 5-minute interval following the time registered in the second column. If the entry is zero, no signal will be transmitted to 206, the Elevator Control System. The elevator will then operate in the normal mode, i.e., the elevator returns to the ground floor after all call requests have been satisfied. If the entry is other than zero, a signal representing the entry is transmitted to the Elevator Control System. The elevator is then caused to operate in a resting mode, i.e., after all call requests have been satisfied, the elevator returns to the floor specified by the entry.

Initially not much is known about the statistics of the demand for service, and the entries in the second column of table 2 would all be zero. The normal mode of operation would then be used. After a week of operation, table 1 may reveal peak loads at certain floors which reoccur at predictable times. Table 2 should then be modified so that at the proper time the resting floor of the elevator is the floor at which the demand exceeds the capacity. With the improved table 2 the undesirable overloading condition would be reduced, and the performance of the system would be improved. If this improvement does not materialize, information stored in table 1 during succeeding days will reveal this fact, and consideration can be given to further changes in table 2. Thus over a period of time, the system performance will drift to an optimum.

In the same way the third column of table 1 is analyzed, and if a large amount of traffic into the elevator at one floor is followed by a large amount of traffic out of the elevator at another floor, and if this occurs at predictable times, then table 2 would be modified to call for the express mode between the two indicated floors and at the indicated time.

The determination of the entries of table 2 from those of table 1 may be done manually. However, in the preferred embodiment a digital computer would be used. In one method the reel of tape containing table 1 is taken from the computer and sent by mail or messenger to a central computing facility. A reel of tape containing table 2 is produced by the digital computer in accordance with a computer program stored at the computing facility. It is then sent back to the elevator site, where it is installed. Alternatively, a computer system incorporating three magnetic tape units located at the elevator site could be used.

The program stored in the computer is based on the following considerations. It is assumed that the same traffic pattern occurs on weekdays, and a different pattern involving much less traffic occurs on Saturdays and Sundays. Table 1 is scanned for the presence of demand exceeding capacity signals occurring during the same time interval on the same day for all five weekdays. If this condition does occur, the number of the floor is registered in column 2, together with the corresponding time. For Saturdays and Sundays, column 2 of table 2 is always empty. During the analysis run of the computer, a new table 2 is assembled and stored on tape unit 205. The table is then transferred to tape unit 204, and the elevator system will then operate in accordance with instructions from the new table.

A performance index is determined by the computer by computing the total number of entries in column 2 of table 1 which are other than zero. The number so determined is the number of times per week that the demand exceeded the capacity of the system. A smaller number indicates better performance of the system.

The embodiment of FIG. 6 has been limited to a single elevator to simplify the description of the invention. A system comprising a number of elevators is a straightforward extension of what has already been disclosed. Additional flexibility is present with a number of elevators since some of them may be operated in one mode at the same time that other are operating in a different mode.

Improved performance can be achieved by using the output of the sensors to influence the operation of the elevator system immediately, in addition to the indirect influence already disclosed. FIG. 2 shows a dotted line connecting blocks 4 and 5 to block 11, and from there to block 6. This indicates that a portion of the tape of block 11 is used to switch the output of the sensors into the logical switching unit if an analysis of the data of table 2 indicates that it is desirable to do so. The Elevator Control System is designed so that if a demand exceeds capacity signal appears at one elevator, and another elevator registers no demand, as shown by the call pushbutton signals, the second elevator is dispatched to that floor, regardless of the entry in table 2, column 2.

The traffic flow sensors of FIGS. 3 and 4 are used in conjunction with an express mode of an elevator. If an output signal appears on leads 110 and/or 111 of FIG. 4, the number of the floor at which the signal occurred is registered in column 3 of table 1. The entry in column 3, if one is present, then specifies the floor at which excess traffic flow into and out of the elevator occurred.

The express mode is controlled by column 3 of table 2. If two numbers are present in column 3 the elevator will travel without stopping between the two floors corresponding to the two numbers. The determination of the entries of column 3 of table 2 from column 3 of table 1 is done by the weekly analysis run of the computer, using techniques already described. Table 1 is scanned for excess traffic flow into the elevator on one floor followed by excess traffic flow out of the elevator at another floor. If this condition occurs during the same 5-minute interval for the same two floors for all five days of the week, then corresponding entries are made in column 3 of table 2.

The traffic flow sensors are also used to influence the operation of the elevator system immediately. If the traffic entering and leaving two floors respectively exceeds a predetermined volume, the Elevator Control System is designed to place one elevator in an express mode between the two floors, regardless of the entries in table 2.

Figure 7:
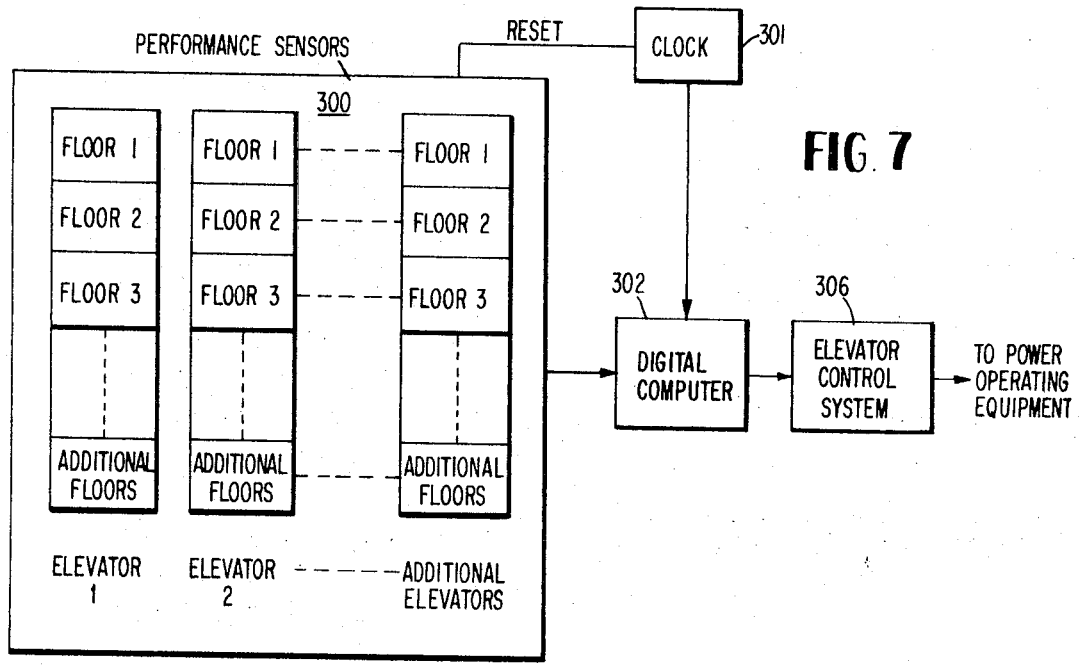
FIG. 7 is a block diagram of an elevator system having many elevators, many types of performance indicating sensors, and many modes of operation.

It is evident that sensors different in design than the specific ones disclosed may be used. The operational modes may also differ in kind and number from the ones disclosed. This is illustrated in FIG. 7, where block 300 contains a number of different types of performance sensors. Clock 301 resets these sensors periodically, and also furnishes signals representing the date and time to the digital computer 302. The digital computer stores the signals from the performance sensors over a period of time as table 1. At the same time it is controlling the mode of operation of the elevator system using a stored table 2 and the sensor signals. Periodically the computer analyzes the stored data in table 1 and produces an improved table 2, using a program stored in the computer. The basic feature of the invention is that a history of the output of the sensors is accumulated over a period of time. This history is analyzed using the principles of probability, statistics, and operations research, and the operational mode of the system is then modified so that the overall performance is improved. Provision may be made for the consideration of factors other than the outputs of the sensors in determining the improved operational mode, as for example, a sudden increase in traffic to a certain floor may be known in advance, but would not be predictable from the history of the sensor output alone.

I claim:

1. In a transportation system including a plurality of vehicles serving a plurality of stations and means for operating said vehicles, an improved adaptive control system comprising in combination:

a. sensor means for producing signals representing the performance of said vehicles over a period of time, b. a digital computer coupled to said sensor means for storing said signals and programmed to analyze said signals to produce a record of control signals for optimizing the operation of said vehicles in accordance with the analysis, and c. means responsive to s record for controlling said operating means in accordance with said record and said sensor means.

2. The improved control system of claim 1 wherein said vehicles are elevators and said stations are floors in a building in which said elevators are operating.

3. The improved control system of claim 2 wherein said sensor means comprises means for producing first signals representing the demand for an elevator at each floor at selected time intervals, said computer being responsive to said first signals to produce a record for controlling said operating means to return to a floor, at time intervals during which the demand exceeds the capacity of an elevator, an elevator for which there is no demand.

4. The improved control system as defined in claim 3 wherein said sensor means further comprises means for producing second signals representing the traffic entering and leaving each elevator at different pairs of floors at selected time intervals, said computer being responsive to said second signals for producing a record for controlling said operating means so that at least one elevator is operated in an express mode directly between two floors during those time intervals at which the entering and leaving traffic, respectively, between those two floors, exceeds a predetermined volume.

5. A method of optimizing the performance of a transportation system including a plurality of vehicles operating among a plurality of vehicle stations comprising the steps of:

a. continuously sensing over a period of time signals representing the performance of the system, b. storing the signals, c. analyzing the stored signals to derive a history of the system performance over the period of time, and d. modifying the operation of the vehicles in accordance with the performance history to optimize the performance of the transportation system.

6. A method of adaptively controlling the mode of operation of a plurality of vehicles serving a plurality of stations in a transportation system comprising the steps of:
   a. continuously sensing over a period of time first signals representing the demand for a vehicle at each of said stations,
   b. establishing a predetermined capacity for each of said vehicles,
   c. comparing the demand at each station with the predetermined capacity, and
   d. when the demand at a station exceeds the predetermined capacity of a vehicle, controlling the mode of operation of the vehicle to optimize the performance of the transportation system.

7. The method of claim 6 wherein the controlling step further comprises returning a vehicle for which there is no demand to a station at which the demand exceeds the capacity of a vehicle.

8. The method of claim 7 further comprising the steps of:
   a. continuously sensing over a period of time second signals representing the traffic entering and leaving a vehicle at each station at
   b. comparing second signals representing traffic entering and leaving a vehicle at different pairs of stations, and
   c. when traffic entering and leaving two stations, respectively, exceeds a predetermined volume, further controlling the mode of operation so that at least one vehicle is placed in an express mode to travel directly between the two stations.